(12) United States Patent
Harada et al.

(10) Patent No.: US 6,739,715 B2
(45) Date of Patent: May 25, 2004

(54) INK COMPOSITION FOR INK JET RECORDING, INK JET RECORDING METHOD, COMPOSITION FOR COLOR TONER, AND COMPOSITION FOR COLOR FILTER

(75) Inventors: Toru Harada, Kanagawa (JP); Nobuhiro Nishita, Kanagawa (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 10/208,807

(22) Filed: Aug. 1, 2002

(65) Prior Publication Data

US 2003/0117474 A1 Jun. 26, 2003

(30) Foreign Application Priority Data

Aug. 6, 2001 (JP) .................................. 2001-237599

(51) Int. Cl.$^7$ .................................................. B41J 2/01
(52) U.S. Cl. ...................... 347/100; 347/96; 106/31.13; 106/31.27; 523/160
(58) Field of Search ............ 347/100, 96, 95, 347/101; 106/31.13, 31.27, 31.46, 31.47, 31.5, 31.51, 31.48, 31.49, 31.6; 523/160

(56) References Cited

U.S. PATENT DOCUMENTS

| | | | | |
|---|---|---|---|---|
| 4,711,668 A | * | 12/1987 | Shimada et al. | 106/31.48 |
| 4,885,272 A | * | 12/1989 | Chapman et al. | 428/195 |
| 5,166,124 A | * | 11/1992 | Weber | 428/195 |
| 5,622,550 A | * | 4/1997 | Konishi et al. | 347/100 |
| 5,779,781 A | * | 7/1998 | Gregory et al. | 106/31.51 |
| 6,200,370 B1 | * | 3/2001 | Fijiwara et al. | 106/31.48 |
| 6,426,169 B1 | * | 7/2002 | Onuma et al. | 430/108.23 |

FOREIGN PATENT DOCUMENTS

JP  2000-169777  *  6/2000  ............ B41J/2/01

* cited by examiner

*Primary Examiner*—Stephen D. Meier
*Assistant Examiner*—Manish Shah
(74) *Attorney, Agent, or Firm*—Burns, Doane, Swecker & Mathis, LLP

(57) ABSTRACT

The present invention provides an ink composition for ink jet printing, a composition for color toner, and a composition for a color filter, all of which contain a dye represented by the following General Formula (1), and an ink jet recording method using the ink composition for ink jet recording.

$$A—N=N—B$$

In General Formula (1), A and B independently represent a heterocyclic group which may be substituted. At least one of A and B includes an alkyl chain having at least 4 carbon atoms, and no ionic hydrophilic group is included.

18 Claims, No Drawings

INK COMPOSITION FOR INK JET RECORDING, INK JET RECORDING METHOD, COMPOSITION FOR COLOR TONER, AND COMPOSITION FOR COLOR FILTER

BACKGROUND OF THE INVENTION

1. Field of the Invention

The present invention relates to an ink composition for ink jet recording containing an azo dye, an ink jet recording method, a composition for color toner, and a composition for a color filter.

2. Description of the Related Art

Recently, materials for forming color images in particular are mainly used as image recording materials. Specifically, recording materials for ink jet recording, recording materials for electrophotography, silver halide photosensitive materials for a transfer method, printing inks, recording pens, and the like are often used. Further, color filters are used for imaging elements such as CCDs in photographing equipment or for displays such as LCDs and PDPs in order to record or reproduce color images.

In order to reproduce or record full-color images, dyes and pigments of the so-called three additive colors or three subtractive colors are used for the color image recording materials or color filters. However, in the present situation, dyes and pigments which have such absorption property that a preferable color reproduction range can be realized and which are fast enough to tolerate various operating conditions and environmental conditions have not been provided. Therefore, improvement of dyes and pigments has been strongly demanded.

Ink jet recording methods have spread rapidly and are developing further since they enable low material cost, high-speed recording, low noise during recording, and simple color recording.

Examples of the ink jet recording methods include a continuous method, in which droplets are made to fly continuously, and an on-demand method, in which droplets are made to fly in accordance with image information signals. In these methods, droplets are discharged by: applying pressure using piezo elements; using heat to generate air bubbles in ink; using ultrasonic wave; or being attracted by electrostatic force. Further, water-based inks, oil-based inks, or solid (melting type) inks are used as inks for ink jet recording.

Dyes or pigments used in such inks for ink jet recording need to: have good solubility for or dispersibility in a solvent; enable high density recording; have good hue; have fastness to light, heat, and active gas in an environment (e.g., oxidizing gas such as $NO_x$ and ozone, and others such as $SO_x$); have excellent fastness to water and chemicals; exhibit good fixing on image receiving materials and hardly cause bleeding; have excellent preservation as inks; have no toxicity; have high purity; and be available at low cost. However, it is extremely difficult to seek for dyes or pigments which satisfy these demands at a high level. In particular, there is a strong demand for dyes or pigments that have good yellow hue and are fast to light, moisture, and for those which are fast to oxidizing gas in an environment such as ozone when printing is carried out on an image receiving material which has an ink receiving layer containing white and porous inorganic pigment particles.

Generally, toner in which a coloring material is dispersed in resin particles is widely used in electrophotographic color copiers or electrophotographic color laser printers. Examples of properties required for the toner include absorption property, with which a preferable color reproduction range can be realized, high transmittance (transparency), which is particularly required when the toner is used for overhead projectors (hereinafter referred to as "OHPs"), and fastness under environmental conditions used. Japanese Patent Application Laid-Open (JP-A) Nos. 62-157051, 62-255956, and 6-118715 respectively disclose toner in which a pigment is dispersed in resin particles as a coloring material. However, although these toners have excellent light resistance, they are insoluble and thus easily flocculate, thereby causing problems of deterioration in transparency or changes in the hue of a transmission color. JP-A Nos. 3-276161, 7-209912, and 8-123085 respectively disclose toner in which a dye is used as a coloring material. Although these toners have high transparency and cause no changes in the hue, they have a problem in terms of light resistance.

Since it is necessary for color filters to be highly transparent, they have been produced by a method in which a filter is dyed with a dye. For example, a color filter can be manufactured by a method in which a photoresist to be dyed to thereby form a pattern, dying the pattern using a dye for the filter color, and then repeating this process for all filter colors. The color filter can also be manufactured by methods other than the dying method, such as methods disclosed in U.S. Pat. No. 4,808,501 and JP-A No. 6-35182 which use a positive photoresist. Since these methods use a dye, transmittance is high and optical characteristics of the color filter are excellent. However, there is a limit to resistance to light and heat, and therefore, a dye having excellent resistance and high transparency has been demanded. A method which uses an organic pigment having excellent resistance to light and heat instead of a dye has been widely known. However, it has been difficult for a pigment-containing color filter to obtain such optical characteristics as those obtained by a dye-containing color filter.

The dyes to be used in various applications as described above need to have the following characteristics in common: preferable absorption property in view of color reproduction; fastness under environmental conditions used; resistance to light, heat, moisture, and oxidizing gas such as ozone; good fastness to chemicals such as sulfurous acid gas; and a large molar absorption coefficient.

Azo dyes have been conventionally used as yellow dyes. Although a pyridone azo dye disclosed in JP-A No. 6-184481 is known as an azo dye of good hue, this dye has a problem of poor lightfastness. Further, the dye has extremely poor fastness to oxidizing gas such as ozone. The present inventors have studied a dye which is fast to light and oxidizing gas such as ozone and have found, as a result, that a hetero—hetero azo dye, particularly a thiadiazolyl-azo-pyrazole yellow dye is favorable. Although JP-A No. 2-24191 and the like are known as the applications relating to the thiaziazolyl-azo-pyrazole yellow dyes, they do not disclose the use of the dyes for inks for ink jet recording. Further, the applications do not disclose that these dyes are fast to oxidizing gas such as ozone, and the dyes are not sufficiently soluble in solvents and thus are not preferable as oil-soluble dyes.

SUMMARY OF THE INVENTION

An object of the present invention is to solve the conventional problems described above and achieve the following purposes: (1) to provide various color compositions which provide color images and color materials having excellent hue and fastness and are used for an ink for ink jet printing, color toner for electrophotography, and a color filter used in a display such as a LCD or a PDP, and in an imaging element such as a CCD; and (2) to provide an ink jet recording method which can form, using the color composition, an image having good hue and high fastness to light and active gas in an environment, particularly ozone.

The inventors achieved the present invention after learning, as a result of intensive studies on azo dye derivatives for the purpose of obtaining a dye having good hue, high fastness to light and ozone, and high solubility, that the above problems can be solved by a dye represented by the following General Formula (1).

A first aspect of the present invention is an ink composition for ink jet recording containing at least one dye represented by the following General Formula (1):
General Formula (1)

wherein A and B independently represent a heterocyclic group which may be substituted; at least one of A and B includes an alkyl chain having at least 4 carbon atoms; and no ionic hydrophilic group is included.

A second aspect of the present invention is an ink jet recording method, in which an image is formed on an image receiving material comprising a support having disposed thereon an ink receiving layer containing white inorganic pigment particles, by using the ink composition for ink jet recording.

A third aspect of the present invention is a composition for color toner which contains a dye represented by General Formula (1).

A fourth aspect of the present invention is a composition for a color filter which contains a dye represented by General Formula (1).

DESCRIPTION OF THE PREFERRED EMBODIMENTS

The present invention will be hereinafter described in detail.
Dye

In the present invention, a dye represented by the following General Formula (1) is preferably used.
General Formula (1)

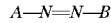

In Formula (1), A and B independently represent a heterocyclic group which may be substituted. Examples of the heterocycle represented by A include 5-pyrazolone ring, 5-aminopyrazole ring, oxazolone ring, barbituric acid ring, pyridone ring, rhodanine ring, pyrazolidinedione ring, pyrazolopyridone ring, merdramic acid ring, and pyrazolotriazole ring. 5-aminopyrazole ring is preferable.

Preferable examples of the heterocycle represented by B include 5-member or 6-member rings, and they may be further condensed. The heterocycle may be an aromatic heterocycle or a non-aromatic heterocycle. Specific examples of the heterocycle include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperadine, imidazolidine, thiazoline, and the like. Thiadiazole is preferable.

Substituents for A and B are the same as those for aryl groups to be described later.

In the present invention, the dye represented by General Formula (1) includes at least one alkyl chain having 4 or more carbon atoms. Namely, at least one of A and B includes at least one alkyl chain having 4 or more carbon atoms in a molecule, and preferably the dye includes 2 or more alkyl chains. The most preferable dye includes substituents which have 17 or more carbon atoms in total. Further, the dye represented by General Formula (1) does not include an ionic hydrophilic group in a molecule.

Moreover, it is preferable that the dye represented by General Formula (1) is a dye represented by the following General Formula (2): General Formula (2)

General Formula (2)

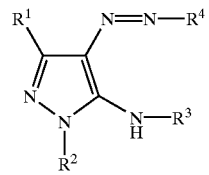

wherein $R^1$ and $R^3$ each represent a hydrogen atom, an alkyl group, a cycloalkyl group, an aralkyl group, an alkoxy group or an aryl group, $R^2$ represents a hydrogen atom, an alkyl group, a cycloalkyl group, an aralkyl group, a carbamoyl group, an acyl group, an aryl group or a heterocyclic group; $R^4$ represents a heterocyclic group; at least one of $R^1, R^2, R^3$ and $R^4$ includes an alkyl chain having at least 4 carbons; and no ionic hydrophilic group is included.

In General Formula (2), alkyl groups represented by $R^1$ to $R^3$ are substituted or unsubstituted alkyl groups. The substituted or unsubstituted alkyl groups preferably have 1 to 30 carbon atoms. Examples of the substituent include those which are the same as those for aryl groups to be described later. Among the substituents, an alkoxy group, a cyano group, and a halogen atom are preferable. Examples of the alkyl groups include methyl, ethyl, butyl, t-butyl, n-hexyl, n-octyl, eicosyl, 2-chloroethyl, hydroxyethyl, and cyanoethyl.

Cycloalkyl groups represented by $R^1$ to $R^3$ are substituted or unsubstituted cycloalkyl groups. The substituted or unsubstituted cycloalkyl groups preferably have 5 to 30 carbon atoms. Examples of the substituent include those which are the same as those for aryl groups to be described later. Examples of the cycloalkyl groups include cyclohexyl, cyclopentyl, and 4-n-dodecylcyclohexyl.

Aralkyl groups represented by $R^1$ to $R^3$ are substituted or unsubstituted aralkyl groups. The substituted or unsubstituted aralkyl groups preferably have 7 to 30 carbon atoms. Examples of the substituent include those which are the same as those for aryl groups to be described later. Examples of the aralkyl groups include benzyl and 2-phenethyl.

Alkoxy groups represented by $R^1$ to $R^3$ are substituted or unsubstituted alkoxy groups. The substituted or unsubstituted alkoxy groups preferably have 1 to 30 carbon atoms. Examples of the substituent include those which are the same as those for aryl groups to be described later. Examples of the alkoxy groups include methoxy, ethoxy, isopropoxy, n-octyloxy, methoxyethoxy, and hydroxyethoxy.

Aryl groups represented by $R^1$ to $R^3$ are substituted or unsubstituted aryl groups. The substituted or unsubstituted aryl groups preferably have 6 to 30 carbon atoms. Examples of the substituent include halogen atoms, alkyl groups, cycloalkyl groups, aralkyl groups, alkenyl groups, alkynyl groups, aryl groups, heterocyclic groups, cyano group, hydroxyl group, nitro group, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino group), acylamino groups, aminocarbonylamino groups, alkoxycarbonylamino groups, aryloxycarbonylamino groups, sulfamoylamino groups, alkylsulfonylamino groups, arylsulfonylamino groups, mercapto group, alkylthio groups, arylthio groups, heterocyclicthio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, imide groups, phosphino groups, phosphinyl groups, phosphinyloxy groups, phosphinylamino groups, and silyl groups.

Specifically, halogen atoms represent chlorine atom, bromine atom, and iodine atom. Alkyl groups, alkoxy groups, cycloalkyl groups, and aralkyl groups are the same as those described above.

Alkenyl groups represent substituted or unsubstituted alkenyl groups that are linear, branched or cyclic. Examples thereof include substituted or unsubstituted alkenyl groups having 2 to 30 carbon atoms, such as vinyl, allyl, prenyl, geranyl, oleyl, 2-cyclopentene-1-yl, and 2-cyclohexene-1-yl.

Alkynyl groups are substituted or unsubstituted alkynyl groups having 2 to 30 carbon atoms, such as ethynyl and propargyl.

Aryl groups are substituted or unsubstituted aryl groups having 6 to 30 carbon atoms, such as phenyl, p-tolyl, naphthyl, m-chlorophenyl, and o-hexadecanoylaminophenyl.

Heterocyclic groups are monovalent groups in which a hydrogen atom has been removed from a 5- or 6-membered, substituted or unsubstituted, and aromatic or non-aromatic heterocyclic compound, and more preferably are 5- or 6-membered aromatic heterocyclic groups having 3 to 30 carbon atoms, such as 2-furyl, 2-thienyl, 2-pyrimidinyl, and 2-benzothiazolyl.

Aryloxy groups are substituted or unsubstituted aryloxy groups having 6 to 30 carbon atoms, such as phenoxy, 2-methylphenoxy, 4-t-butylphenoxy, 3-nitrophenoxy, and 2-tetradecanoylaminophenoxy.

Silyloxy groups are those having 3 to 20 carbon atoms, such as trimethylsilyloxy and t-butyldimethylsilyloxy.

Heterocyclic oxy groups are substituted or unsubstituted heterocyclic oxy groups having 2 to 30 carbon atoms, such as 1-phenyltetrazol-5-oxy and 2 -tetrahydropyranyloxy.

Acyloxy groups are formyloxy group, substituted or unsubstituted alkylcarbonyloxy groups having 2 to 30 carbon atoms, and substituted or unsubstituted arylcarbonyloxy groups having 6 to 30 carbon atoms, such as formyloxy, acetyloxy, pivaloyloxy, stearoyloxy, benzoyloxy, and p-methoxyphenylcarbonyloxy.

Carbamoyloxy groups are substituted or unsubstituted carbamoyloxy groups having 1 to 30 carbon atoms, such as N,N-dimethylcarbamoyloxy, N,N-diethylcarbamoyloxy, morpholinocarbonyloxy, N,N-di-n-octylaminocarbonyloxy, and N-n-octylcarbamoyloxy.

Alkoxycarbonyloxy groups are substituted or unsubstituted alkoxycarbonyloxy groups having 2 to 30 carbon atoms, such as methoxycarbonyloxy, ethoxycarbonyloxy, t-butoxycarbonyloxy, and n-octylcarbonyloxy.

Aryloxycarbonyloxy groups are substituted or unsubstituted aryloxycarbonyloxy groups having 7 to 30 carbon atoms, such as phenoxycarbonyloxy, p-methoxyphenoxycarbonyloxy, and p-n-hexadecyloxyphenoxycarbonyloxy.

Amino groups are substituted or unsubstituted alkylamino groups having 1 to 30 carbon atoms, and substituted or unsubstituted anilino groups having 6 to 30 carbon atoms, such as amino, methylamino, dimethylamino, anilino, N-methyl-anilino, and diphenylamino.

Acylamino groups are formylamino group, substituted or unsubstituted alkylcarbonylamino groups having 1 to 30 carbon atoms, and substituted or unsubstituted arylcarbonylamino groups having 6 to 30 carbon atoms, such as formylamino, acetylamino, pivaloylamino, lauroylamino, benzoylamino, and 3,4,5-tri-n-octyloxyphenylcarbonylamino.

Aminocarbonylamino groups are substituted or unsubstituted aminocarbonylamino groups having 1 to 30 carbon atoms, such as carbamoylamino, N,N-dimethylaminocarbonylamino, N,N-diethylaminocarbonylamino, and morpholinocarbonylamino.

Alkoxycarbonylamino groups are substituted or unsubstituted alkoxycarbonylamino groups having 2 to 30 carbon atoms, such as methoxycarbonylamino, ethoxycarbonylamino, t-butoxycarbonylamino, n-octadecyloxycarbonylamino, and N-methyl-methoxycarbonylamino.

Aryloxycarbonylamino groups are substituted or unsubstituted aryloxycarbonylamino groups having 7 to 30 carbon atoms, such as phenoxycarbonylamino, p-chlorophenoxycarbonylamino, and m-n-octyloxyphenoxycarbonylamino.

Sulfamoylamino groups are substituted or unsubstituted sulfamoylamino groups having 0 to 30 carbon atoms, such as sulfamoylamino, N,N-dimethylaminosulfonylamino, and N-n-octylaminosulfonylamino.

Alkylsulfonylamino and arylsulfonylamino groups are substituted or unsubstituted alkylsulfonylamino having 1 to 30 carbon atoms, and substituted or unsubstituted arylsulfonylamino having 6 to 30 carbon atoms, such as methylsulfonylamino, butylsulfonylamino, phenylsulfonylamino, 2,3,5-trichlorophenylsulfonylamino, and p-methylphenylsulfonylamino.

Alkylthio groups are substituted or unsubstituted alkylthio groups having 1 to 30 carbon atoms, such as methylthio, ethylthio, and n-hexadecylthio.

Arylthio groups are substituted or unsubstituted arylthio groups having 6 to 30 carbon atoms, such as phenylthio, p-chlorophenylthio, and m-methoxyphenylthio.

Heterocyclic thio groups are substituted or unsubstituted heterocyclic thio groups having 2 to 30 carbon atoms, such as 2-benzothiazolylthio and 1-phenyltetrazole-5-ylthio.

Sulfamoyl groups are substituted or unsubstituted sulfamoyl groups having 0 to 30 carbon atoms, such as N-ethylsulfamoyl, N-(3-dodecyloxypropyl) sulfamoyl, N,N-dimethylsulfamoyl, N-acetylsulfamoyl, N-benzoylsulfamoyl, and N-(N'-phenylcarbamoyl) sulfamoyl.

Alkylsulfinyl and arylsulfinyl groups are substituted or unsubstituted alkylsulfinyl groups having 1 to 30 carbon atoms, and substituted or unsubstituted arylsulfinyl groups having 6 to 30 carbon atoms, such as methylsulfinyl, ethylsulfinyl, phenylsulfinyl, and p-methylphenylsulfinyl.

Alkylsulfonyl and arylsulfonyl groups are substituted or unsubstituted alkylsulfonyl groups having 1 to 30 carbon atoms, and substituted or unsubstituted arylsulfonyl groups having 6 to 30 carbon atoms, such as methylsulfonyl, ethylsulfonyl, phenylsulfonyl, and p-methylphenylsulfonyl.

Acyl groups are formyl group, substituted or unsubstituted alkylcarbonyl groups having 2 to 30 carbon atoms, substituted or unsubstituted arylcarbonyl groups having 7 to 30 carbon atoms, and heterocyclic carbonyl groups having 4 to 30 carbon atoms and bonded to the carbonyl group via a carbon atom contained in the heterocycle, such as acetyl, pivaloyl, 2-chloroacetyl, stearoyl, benzoyl, p-n-octyloxyphenylcarbonyl, 2-pyridylcarbonyl, and 2-furylcarbonyl.

Aryloxycarbonyl groups are substituted or unsubstituted aryloxycarbonyl groups having 7 to 30 carbon atoms, such as phenoxycarbonyl, o-chlorophenoxycarbonyl, m-nitrophenoxycarbonyl, and p-t-butylphenoxycarbonyl.

Alkoxycarbonyl groups are substituted or unsubstituted alkoxycarbonyl groups having 2 to 30 carbon atoms, such as methoxycarbonyl, ethoxycarbonyl, t-butoxycarbonyl, and n-octadecyloxycarbonyl.

Carbamoyl groups are substituted or unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl.

Phosphino groups are substituted or unsubstituted phosphino groups having 2 to 30 carbon atoms, such as dimethylphosphino, diphenylphosphino, and methylphenoxyphosphino.

Phosphinyl groups are substituted or unsubstituted phosphinyl groups having 2 to 30 carbon atoms, such as phosphinyl, dioctyloxyphosphinyl, and diethoxyphosphinyl.

Phosphinyloxy groups are substituted or unsubstituted phosphinyloxy groups having 2 to 30 carbon atoms, such as diphenoxyphosphinyloxy and dioctyloxyphosphinyloxy.

Phosphinylamino groups are substituted or unsubstituted phosphinylamino groups having 2 to 30 carbon atoms, such as dimethoxyphosphinylamino and dimethylaminophosphinylamino.

Silyl groups are substituted or unsubstituted silyl groups having 3 to 30 carbon atoms, such as trimethylsilyl, t-butyldimethylsilyl, and phenyldimethylsilyl.

As for functional groups having a hydrogen atom among the above functional groups, the hydrogen atom may be eliminated and substituted by the above-mentioned group. Examples of the substituent include an alkylcarbonylaminosulfonyl group, an arylcarbonylaminosulfonyl group, an alkylsulfonylaminocarbonyl group, and an arylsulfonylaminocarbonyl group. Specific examples thereof include methylsulfonylaminocarbonyl, p-methylphenylsulfonylaminocarbonyl, acetylaminosulfonyl, and benzoylaminosulfonyl group.

The carbamoyl group, the acyl group, and the heterocyclic group represented by $R^2$ are the same as the above-mentioned substituents for the aryl groups. Heterocyclic group represented by $R^4$ is the same as B in General Formula (1).

The dye represented by General Formula (2) includes at least one alkyl chain having 4 or more carbon atoms in a molecule. Namely, at least one of $R^1$, $R^2$, $R^3$, and $R^4$ includes an alkyl chain having 4 or more carbon atoms, and the dye preferably includes 2 or more alkyl chains having 4 or more carbon atoms in a molecule. More preferably, the dye includes substituents that have a total of 17 or more carbon atoms. The dye represented by General Formula (2) does not include an ionic hydrophilic group in a molecule.

Further, the dye represented by General Formula (2) is preferably a dye represented by the following General Formula (3):

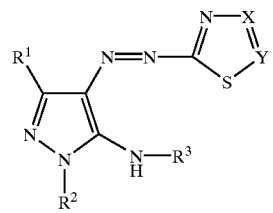

General Formula (3)

wherein $R^1$ and $R^3$ each represent a hydrogen atom, an alkyl group, a cycloalkyl group, an aralkyl group, an alkoxy group or an aryl group; $R^2$ represents a hydrogen atom, an alkyl group, a cycloalkyl group, an aralkyl group, a carbamoyl group, an acyl group, an aryl group or a heterocyclic group; one of X and Y is $CR^5$ and the other is a nitrogen atom; $R^5$ is a hydrogen atom, a halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group; and respective substituents thereof may be further substituted as long as at least one of $R^1$, $R^2$, $R^3$, X, and Y includes an alkyl chain having at least 4 carbon atoms and no ionic hydrophilic group is included.

In General Formula (3), one of X and Y is $CR^5$, and the other is a nitrogen atom. Preferably, X is $CR^5$ and Y is a nitrogen atom. A halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group represented by $R^5$ is the same as the above-mentioned substituent for the aryl group. Further, the dye represented by General Formula (3) includes at least one alkyl chain having 4 or more carbon atoms in a molecule. Namely, at least one of $R^1$, $R^2$, $R^3$, X, and Y includes an alkyl chain having 4 or more carbon atoms, and the dye preferably includes 2 or more alkyl chains having 4 or more carbon atoms in a molecule. Moreover, the dye represented by General Formula (3) does not include an ionic hydrophilic group in a molecule. More preferably, the dye includes substituents that have a total of 17 or more carbon atoms.

In the present invention, the dye represented by General Formulae (1) to (3) includes at least one alkyl chain having 4 or more carbon atoms in a molecule, and preferably 2 or more alkyl chains having 4 or more carbon atoms in a molecule. The most preferable dye is a dye whose subsituents have 17 or more carbon atoms in total.

In the present invention, the dye represented by General Formulae (1) to (3) is more preferably a dye in which, in General Formula (3), $R^1$ is an alkyl group, $R^2$ is an aryl group, $R^3$ is a hydrogen atom, X is $CR^5$, Y is a nitrogen atom, and $R^5$ is any of a hydrogen atom, an alkylthio group, an aryl group, and an alkyl group.

Specific examples of the dye in accordance with the present invention will be given below. However, the dye is not limited to these examples.

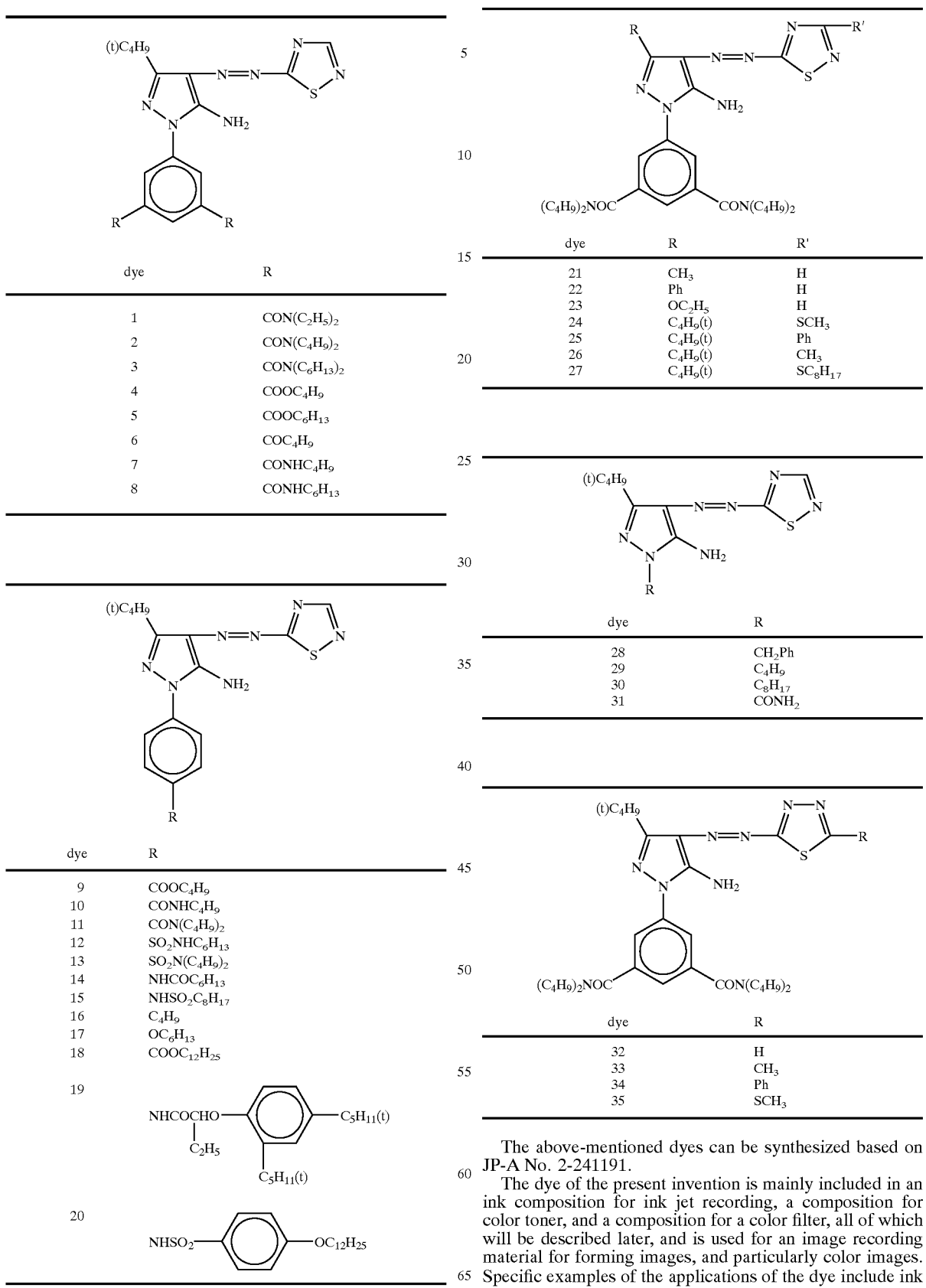

The above-mentioned dyes can be synthesized based on JP-A No. 2-241191.

The dye of the present invention is mainly included in an ink composition for ink jet recording, a composition for color toner, and a composition for a color filter, all of which will be described later, and is used for an image recording material for forming images, and particularly color images. Specific examples of the applications of the dye include ink jet recording materials, which will be described later in detail, pressure-sensitive recording materials, electrophotographic recording materials, transfer-type silver halide photosensitive materials, printing inks, recording pens, and the like. The compositions are used preferably for ink jet recording materials and electrophotographic recording materials, and more preferably, ink jet recording materials.

The dye can also be used for a color filter which is used in a solid-state imaging element such as a CCD or in a display such as a LCD or a PDP to record and reproduce color images, and for solutions for dying various types of fibers.

Properties of the dye of the present invention, such as solubility, dispersibility, and heat transfer property, can be adjusted by changing substituents such that the properties become appropriate for each application. Further, the dye of the present invention can be used in a dissolved state, an emulsified and dispersed state, or a solid and dispersed state, according to the system in which the dye is used.

Ink Composition for Ink Jet Recording

The ink composition for ink jet recording of the present invention includes the above-described dye represented by General Formula (1). The ink composition for ink jet recording according to the invention can be produced by dissolving and/or dispersing the dye of the present invention in a lipophilic or aqueous medium. The medium is preferably aqueous. The ink composition may contain other additives if necessary, as long as they do not adversely affect the effects of the present invention. Examples of the additives include known additives such as an anti-drying agent (wetting agent), a discoloration inhibitor, an emulsion stabilizer, a permeation accelerator, an ultraviolet absorbent, a preservative, a fungicide, a pH regulator, a surface tension adjuster, a defoaming agent, a viscosity controller, a dispersant, a dispersion stabilizer, an antirust, and a chelating agent. These additives are directly added to an ink liquid in the case of a water-soluble ink. When an oil-soluble dye is used in the form of a dispersion, the additives are generally added to the dye dispersion after preparation thereof. However, the additives may be added to an oil phase or an aqueous phase of the dye dispersion during preparation thereof.

The anti-drying agent is suitably used to prevent clogging, which can be otherwise caused by the ink composition for ink jet recording of the present invention drying at ink ejection orifices of nozzles used in ink jet recording.

A water-soluble organic solvent having a vapor pressure lower than that of water is preferable as the anti-drying agent. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerine, and trimethylol propane; lower alkyl ethers of polyhydric alcohol, such as ethylene glycol monomethyl (or ethyl) ether, diethylene glycol monomethyl (or ethyl) ether, and triethylene glycol monoethyl (or butyl) ether; heterocyclic rings such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; polyfunctional compounds such as diacetone alcohol and diethanolamine; and urea derivatives. Polyhydric alcohol such as glycerine or diethylene glycol is preferable. The above-mentioned anti-drying agents may be used alone, or a combination of two or more may be used. These anti-drying agents are preferably included in ink in an amount of 10 to 50% by mass.

The permeation accelerator is suitably used for ink jet recording ink to permeate paper well. Examples of the permeation accelerator which can be used include alcohols such as ethanol, isopropanol, butanol, di(tri)ethylene glycol monobutyl ether, and 1,2-hexanediol, sodium laurylsulfate, sodium oleate, nonionic surfactants, and the like. These permeation accelerators usually achieve sufficient effects when included in ink in an amount of 5 to 30% by mass. The permeation accelerator is preferably used within a range of amounts which do not cause bleeding or print through.

The ultraviolet absorbent is used to improve the shelf life of images. Examples thereof include benzotriazol compounds disclosed in JP-A Nos. 58-185677, 61-190537, 2-782, 5–197075 and 9-34057; benzophenone compounds disclosed in JP-A Nos. 46-2784 and 5-194483, and U.S. Pat. No. 3,214,463; cinnamic acid compounds disclosed in Japanese Patent Application Publication (JP-B) Nos. 48-30492 and 56-21141, and JP-A No. 10-88106; triazine compounds disclosed in JP-A Nos. 4-298503, 8-53427, 8-239368, 10-182621, and 8-501291; compounds disclosed in Research Disclosure (RD) No. 24239; compounds which absorb ultraviolet rays to generate fluorescence, such as stilbene and benzoxazol compounds; and so-called fluorescent brightening agents.

The discloloration inhibitor is used to improve the shelf life of images. Various organic compounds and metal complexes can be used as a discoloration inhibitor. Examples of the organic discoloration inhibitor include hydroquinones, alkoxyphenols, dialkoxyphenols, phenols, anilines, amines, indans, chromans, alkoxyanilines, and heterocycles, and examples of the metal complex include a nickel complex and a zinc complex. More specifically, the compounds disclosed in the cited patents described in the I or J paragraph of the VII section of RD No. 17643, RD No. 15162, the left column of page 650 of RD No. 18716, page 527 of RD No. 36544, page 872 of RD No. 307105, and RD No. 15162, and compounds included in General Formula of the representative compound and examples of the compound described in JP-A No.62-215272, pp. 127–137 can be used.

Examples of the fungicide include sodium dehydroacetate, sodium benzoate, sodium pyridinethione-1-oxide, ethyl p-hydroxybenzoate, 1,2-benzisothiazoline-3-on and salts thereof. The fungicide is preferably included in the ink composition for ink jet recording in an amount of 0.02 to 1.00% by mass.

A neutralizer (an organic base or an inorganic alkali) can be used as the pH regulator. The pH regulator is used to improve the shelf life of the ink composition for ink jet recording and preferably added to the ink composition so that the pH thereof becomes 6 to 10, and more preferably 7 to 10.

A nonionic, cationic or anionic surfactant can be used as the surface tension adjuster. The ink composition for ink jet recording of the present invention has a surface tension of preferably 20 to 60 mN/m, and more preferably 25 to 45 mN/m. Further, the viscosity of the ink composition for ink jet recording is adjusted to preferably 30 mPa·s or less, and more preferably 20 mPa·s or less.

Preferable examples of the surfactant include anionic surfactants such as fatty acid salt, alkyl sulfate, alkyl benzenesulfonate, alkyl naphthalenesulfonate, dialkyl sulfosuccinate, alkyl phosphate, naphthalenesulfonic acid-formalin condensates, and polyoxyethylene alkyl sulfate, and nonionic surfactants such as polyoxyethylene alkyl ether, polyoxyethylene alkyl aryl ether, polyoxyethylene fatty acid ester, sorbitan fatty acid ester, polyoxyethylene sorbitan fatty acid ester, polyoxyethylene alkyl amine, glycerine fatty acid ester, and oxyethylene oxypropyrene block copolymers. Further, SURFYNOLS (Air Products &

Chemicals, Inc.), which is an acetylene-based polyoxyethylene oxide surfactant, is preferably used. An amine oxide-type amphoteric surfactant such as N,N-dimethyl-N-alkylamineoxide is also preferable. The surfactants disclosed in JP-A No. 59-157636, pp. 37–38 and RD No.308119 (1989) can also be used.

Fluorine-containing compounds and silicone compounds and chelating agents including EDTA can be used as the defoaming agent.

When the dye of the present invention is dispersed in an aqueous medium, it is preferable that colored particles containing the dye and an oil-soluble polymer are dispersed in an aqueous medium, as disclosed in JP-A Nos. 11-286637, 2001-240763, 2001-262039 and 2001-247788, or that the dye of the present invention, which has been dissolved in a high boiling organic solvent, is dispersed in an aqueous medium, as disclosed in JP-A Nos. 2001-262018, 2001-240763, 2001-335734, and 2002-80772. As for specific methods for dispersing the dye of the present invention in an aqueous medium, and an oil-soluble polymer, a high boiling organic solvent, and additives to be used and amounts thereof, those disclosed in the above-mentioned patent applications can be preferably used. Alternatively, the azo dye may be dispersed in the form of solid fine particles. A dispersing agent or a surfactant can be used during dispersion of the dye. Examples of a dispersing machine which can be used include a simple stirrer, dispersing machines of impeller type, in-line stirring type, mill type (such as a colloid mill, a ball mill, a sand mill, an attritor, a roll mill, an agitator mill, and the like), ultrasonic type, and high-pressure emulsification type (such as a high-pressure homogenizer; specifically, as for commercially available machines, GAULIN HOMOGENIZER, MICROFLUIDIZER, DeBEE 2000, and the like). Detailed methods for preparing the above-mentioned ink for ink jet recording are also disclosed in JP-A Nos. 5-148436, 5-295312, 7-97541, 7-82515, 7-118584, 11-286637, and 2001-271003, in addition to the above-mentioned patent applications. These methods can also be used to prepare ink for in jet recording which contains the ink composition for ink jet recording of the present invention.

The aqueous medium includes water as a main component. A mixture having a water-miscible organic solvent added thereto can be used, if desired. Examples of the water-miscilbe organic solvent include alcohol such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propyrene glycol, dipropyrene glycol, polypropyrene glycol, butyrene glycol, hexanediol, pentanediol, glycerine, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propyrene glycol monomethyl ether, propyrene glycol monobutyl ether, dipropyrene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether; amine such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropyrenediamine; and other polar solvents such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone. The water-miscible organic solvents may be used alone, or a combination of two or more may be used.

The ink composition for ink jet recording of the present invention preferably contains 0.2 to 10 parts by mass of the dye of the present invention. Further, the ink composition for ink jet recording of the present invention may include other dyes as well as the dye of the present invention. When two or more dyes are used, the total content of the dyes is preferably within the above-mentioned range.

The ink composition for ink jet recording of the present invention can be used to form not only unicolor images but also full-color images. Magenta ink, cyan ink, and yellow ink can be used to form full-color images. Black ink can also be used to adjust the color tone.

As for a yellow dye, any yellow dye can be used together with the dye of the present invention. Examples of the yellow dye include an aryl or heterylazo dye including, for example, phenols, naphtols, anilines, heterocycles such as pyrazolone and pyridone, and closed active methylene compounds as coupling components (hereinafter occasionally referred to as "coupler components"); an azomethyne dye including, for example, closed active methylene compounds as the coupler components; a methyne dye such as a benzylidene dye or a monomethyne oxonol dye; a quinone dye such as a naphthoquinone dye or an anthraquinone dye; a quinophthalone dye; a nitro/nitroso dye; an acridine dye; and an acridinone dye.

As for a magenta dye, any magenta dye can be applied to the present invention. Examples of the magenta dye include an aryl or heterylazo dye including, for example, phenols, naphthols, and anilines as the coupler components; an azomethyne dye including pyrazolones and pyrazolotriazol as the coupler components; a methyne dye such as an arylidene dye, a styryl dye, a melocyanine dye, a cyanine dye, or an oxonol dye; a carbonium dye such as a diphenylmetane dye, a triphenylmetane dye, or a xanthene dye; a quinone dye such as naphtoquinone, anthraquinone, and anthrapyridone; and a condensed polycyclic dye such as a dioxazine dye.

As for a cyan dye, any cyan dye can be applied to the present invention. Examples of the cyan dye include an aryl or heterylazo dye including, for example, phenols, naphthols, and anilines as the coupler components; an azomethyne dye including phenols, naphthols, and heterocycles such as pyrrolotriazol as the coupler components; a polymethyne dye such as a cyanine dye, an oxonol dye, or a melocyanine dye; a carbonium dye such as a diphenylmethane dye, a triphenylmethane dye, or a xanthene dye; a phthalocyanine dye; an anthraquinone dye; and an indigo/thioindigo dye.

The above-described dyes may form the colors of yellow, magenta, and cyan, respectively, after a part of chromophores has dissociated from the dyes. In such a case, the counter cation may be an inorganic cation such as alkali metal or ammonium, an organic cation such as pyridinium or quaternary ammonium salt, or a polymer cation having an organic or inorganic cation in the structure.

Examples of black materials which can be applied to the present invention include a disazo dye, a trisazo dye, a tetraazo dye, and dispersed carbon black.

Ink Jet Recording Method

The ink jet recording method of the present invention provides energy to an ink jet printing ink containing the ink composition for ink jet recording of the present invention to form images on known image receiving materials, such as plain paper, resin-coated paper, ink jet printing paper disclosed in, for example, JP-A Nos. 8-169172, 8-27693, 2-276670, 7-276789, 9-323475, 62-238783, 10-153989, 10-217473, 10-235995, 10-337947, 10-217597, and 10-337947, films, paper for both ink jet recording and electrophotography, cloth, glass, metal, ceramics, and the like.

When an image is formed, a polymer latex compound can be used together with the image receiving material in order to impart glossiness or water resistance and improve weather resistance. The latex compound may be applied to the image receiving material before, after, or simultaneously with the application of a colorant. Further, the latex compound may be added to the image receiving paper or ink, or may be separately used as a liquid polymer latex. Specifically, methods disclosed in JP-A Nos. 2002-166638, 2002-121440, 2002-154201, 2002-144696, 2002-80759, 2002-187342, and 2002-172774 can be preferably used.

Hereinafter, recording paper and recording films used for ink jet printing with an ink jet printing ink comprised of the ink composition for ink jet recording of the present invention will be described. Supports for the recording paper and recording films which can be used are made of chemical pulp such as LBKP and NBKP; mechanical pulp such as GP, PGW, RMP, TMP, CTMP, CMP, and CGP; or waste paper pulp such as DIP. Conventionally known additives such as a pigment, a binder, a sizing agent, a fixing agent, a cationic agent, and a fortifier may be optionally added to the supports, and the supports are manufactured using various machines such as a Fourdrinier machine or a cylinder machine. Further, the supports may be synthetic paper or plastic film sheets, and preferably have a thickness of 10 to 250 $\mu$m and a basic weight of 10 to 250 g/m$^2$. An ink receiving layer and a back coat layer may be directly formed on the support, or may be formed thereon after a size press coating or anchor coating layer of starch, polyvinyl alcohol, or the like has been formed on the support. Furthermore, the support may be flattened by a calender such as a machine calender, a TG calender, or a soft calender. In the present invention, paper whose both sides have been laminated with polyolefin (such as polyethylene, poslystyrene, polyethylene terephthalate, polybutene or copolymers thereof) or a plastic film is more preferably used. A white pigment (such as titanium oxide or zinc oxide) or a coloring dye (such as cobalt blue, ultramarine, or neodium oxide) is preferably added to polyolefin.

The ink receiving layer provided on the support includes a pigment and an aqueous binder. A white pigment is preferable as the pigment. Examples thereof include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate, and zinc carbonate; and organic pigments such as styrene pigments, acrylic pigments, urea resin, and melamine resin. A porous inorganic pigment, particularly white inorganic pigment particles such as synthetic amorphous silica having a large pore area are preferable as the white pigment included in the ink receiving layer. Although any of silicic anhydride obtained by a dry manufacturing method and hydrous silic acid obtained by a wet manufacturing method can be used as the synthetic amorphous silica, use of hydrous silic acid is particularly preferable.

Examples of the aqueous binder included in the ink receiving layer include water-soluble polymers such as polyvinyl alcohol, silanol-modified polyvinyl alcohol, starch, cationic starch, casein, gelatin, carboxymethyl cellulose, hydroxyethyl cellulose, polyvinyl pyrrolidone, polyalkylene oxide, and polyalkylene oxide derivatives; and water-dispersive polymers such as styrene-butadiene latex and acrylic emulsions. These aqueous binders may be used alone, or a combination of two or more may be used. In the present invention, polyvinyl alcohol and silanol-modified polyvinyl alcohol are particularly preferable in view of adhesion to the pigment and resistance to stripping of the ink receiving layer.

In addition to the pigment and the aqueous binder, the ink receiving layer may include other additives such as a mordant, a water resistance imparting agent, a lightfast improver, and a surfactant.

The mordant added to the ink receiving layer is preferably immobilized. For that purpose, a polymer mordant is preferably used.

Polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236; and U.S. Pat. Nos. 2,484,430, 2,548,564, 3,148,061, 3,309,690, 4,115,124, 4,124,386, 4,193,800, 4,273,853, 4,282,305, and 4,450,224. An image receiving material containing a polymer mordant disclosed in JP-A No. 1-161236, pp. 212–215, is particularly preferable. With this polymer mordant, images of excellent quality can be obtained, and lightfastness of the images is improved.

The water resistance imparting agent is effective for imparting water resistance to images, and cationic resin is particularly desirable. Examples of the cationic resin include polyamidepolyamine epichlorohydrin, polyethylene imine, polyaminesulfone, polymers of dimethyl diallyl ammonium chloride, cationpolyacrylamide, and colloidal silica. Polyamidepolyamine epichlorohydrin is particularly preferable among these cationic resins. The content of the cationic resin is preferably 1 to 15% by mass, and particularly preferably 3 to 10% by mass, based on the total solids of the ink receiving layer.

Examples of the lightfast improver include zinc sulfate, zinc oxide, hindered amine antioxidants, benzophenone ultraviolet absorbents, benzotriazol ultraviolet absorbents, and the like. Zinc sulfate is particularly preferable.

The surfactant functions as an application assistant, a stripping improving agent, a slide improving agent, or an antistatic agent. Examples of the surfactant are disclosed in JP-A Nos. 62-173463 and 62-183457. An organic fluoro compound may be used instead of the surfactant. The organic fluoro compound is preferably hydrophobic. Examples of the organic fluoro compound include fluorine-containing surfactants, oily fluorine-containing compounds (such as fluorine oil), and fluorine-containing solid resins (such as ethylene tetrafluoride resin). The organic fluoro compounds are disclosed in JP-B No. 57-9053 (column 8 to 17), and JP-A Nos. 61-20994 and 62-135826. Examples of other additives that are added to the ink receiving layer include a pigment dispersing agent, a tackifier, a deforming agent, a dye, a fluorescent brightening agent, a preservative, a pH regulator, a matting agent, and a hardening agent. One or two ink receiving layers may be formed.

The recording paper and the recording film can comprise a back coat layer. A white pigment, an aqueous binder, and other components can be added to the back coat layer. Examples of the white pigment included in the back coat layer include inorganic white pigments such as precipitated calcium carbonate light, calcium carbonate heavy, kaolin, talc, calcium sulfate, barium sulfate, titanium dioxide, zinc oxide, zinc sulfate, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, and magnesium hydroxide; and organic pigments such as styrene plastic pigments, acrylic plastic pigments, polyethylene, microcapsules, urea resin, and melamine resin.

Examples of the aqueous binder included in the back coat layer include water-soluble polymers such as a copolymer of styrene and maleate, a copolymer of styrene and acrylate, polyvinyl alcohol, silanol-modified polyvinyl alcohol, starch, cationic starch, casein, gelatin, carboxymethyl cellulose, hydroxyethyl cellulose, and polyvinyl pyrrolidone; and water-dispersive polymers such as styrene-butadiene latex and acrylic emulsions. Examples of other components included in the back coat layer include a deforming agent, a foam inhibitor, a dye, a fluorescent brightening agent, a preservative, and a water resistance imparting agent.

Polymer latex may be added to the layers (including the back coat layer) of the ink jet recording paper and the recording film. Polymer latex is used to improve the properties of a layer, namely, to stabilize the dimensions and prevent curling, adhesion, and cracking of the layer. Examples of the polymer latex are disclosed in JP-A Nos. 62-245258, 62-1316648, and 62-110066. Addition of polymer latex having a low glass transition temperature (such as 40° C. or less) to a layer containing a mordant can prevent the layer from cracking and curling. Further, addition of polymer latex having a high glass transition temperature to the back coat layer can prevent the layer from curling as well.

Recording methods using the ink for ink jet recording containing the ink composition for ink jet recording of the present invention are not limited. The ink is used in known methods such as a charge control method which uses electrostatic attraction to eject ink, a drop-on-demand method (pressure pulse method) which uses vibration pressure of a piezo element, an acoustic ink jet method in which an electric signal is transformed into an acoustic beam and ink is irradiated with the acoustic beam so as to be ejected by radiation pressure, and a thermal ink jet method which uses pressure caused by bubbles formed by heating ink. Examples of the ink jet recording method include a method which uses ink having low concentration called photo ink to eject a multitude of ink droplets having a small volume, a method which uses a plurality of inks having substantially the same color hue but different concentrations to improve image quality, and a method which uses transparent and colorless ink.

Color Toner

A composition for color toner of the present invention contains at least one of the dyes represented by General Formulae (1) to (3). In addition to the dye of the present invention, the composition for color toner contains binder resin for color toner, a release agent, a charge control agent, and a carrier, if necessary. The dye of the present invention is included in an amount of preferably 0.1 parts by mass or more, and particularly preferably 1.0 part by mass or more, based on 100 parts by mass of the composition for color toner of the present invention.

Any binder which is generally used can be used as the binder resin for color toner which introduces therein the dye of the present invention. Examples of the binder resin include styrene resin, acrylic resin, styrene/acrylic acid resin, polyester resin, and the like.

Inorganic fine powders or organic fine particles may be added to the toner in order to improve flowability and charging control. Silica particles or titania particles whose surfaces have been treated with a coupling agent containing an alkyl group are preferably used. These particles preferably have a number average primary particle diameter of 10 to 500 nm and are preferably added to the toner in an amount of 0.1 to 20% by mass.

Any conventional release agent can be used as the release agent. Specific examples of the release agent include olefins such as low molecular weight polypropylene, low molecular weight polyethylene, and copolymers of ethylene and propylene, microcrystalline wax, carnauba wax, Southall wax, paraffin wax, and the like. These release agents are preferably added to the toner in an amount of 1 to 5% by mass.

The charge control agent, which may be optionally added to the toner, is preferably colorless in view of color forming. Examples of the charge control agent include those having the structure of quaternary ammonium salt, calixarene, or the like.

An uncoated carrier solely comprised of particles of a magnetic material such as iron or ferrite, or a resin-coated carrier in which the surfaces of particles of a magnetic material are coated with resin or the like may be used as the carrier. The volume average particle diameter of the carrier is preferably 30 to 150 $\mu$m.

The image forming method in which the composition for color toner of the present invention is used is not particularly limited. Examples of the image forming method include a method in which color images are successively formed on a photoreceptor to form a full color image and then transferred to a recording material, and a method in which color images formed on a photoreceptor are successively transferred to an intermediate transfer medium to form a full color image thereon, and then the formed image is transferred to an image forming material such as paper.

Composition for a Color Filter

The composition for a color filter of the present invention contains at least one of the dyes represented by General Formulae (1) to (3). In addition to the dye, the composition for a color filter of the present invention includes thermosetting resin, a quinondiazide compound, a crosslinking agent, and a solvent, if necessary. The dye of the present invention is included in an amount of preferably 0.1 parts by mass or more, and particularly preferably 1.0 part by mass or more, based on 100 parts by mass of the composition for color toner of the present invention.

Examples of a method for forming a color filter using the composition for a color filter of the present invention include a method in which a pattern is formed by photoresist and then dyed, and the methods disclosed in JP-A Nos. 4-163552, 4-128703, and 4-175753, in which a pattern is formed by photoresist having a dye added thereto. Any of these methods may be used to introduce the dye of the present invention into a composition for a color filter. However, a preferable example is the method disclosed in JP-A No. 4-175753 or 6-35182, in which a color filter is formed by applying a positive photoresist composition containing thermosetting resin, a quinonediazide compound, a crosslinking agent, a dye, and a solvent onto a substrate, exposing the substrate using a mask, developing exposed portions to form a pattern of positive photoresist, exposing the entire positive photoresist pattern, and subsequently hardening the exposed positive photoresist pattern.

Alternatively, a black matrix can be formed in a conventional manner. Thus, filters for the primary colors of red (R), green (G), and blue (B), or filters for the complementary colors of yellow (Y), magenta (M) and cyan (C) can be obtained.

The thermosetting resin, the quinonediazide compound, the crosslinking agent, and the solvent, and the amounts thereof disclosed in the above applications may be preferably used.

EXAMPLES

The present invention will now be described by, but is not limited to, the following Examples.

Example 1

Example of Dispersive Ink
Production of Sample 101

3.75 g of the above-mentioned dye 2 and 7.04 g of sodium dioctylsulfosuccinate were dissolved in 4.22 g of a high boiling organic solvent (s-2) shown below, 5.63 g of a high boiling organic solvent (s-1) shown below, and 50 ml of ethyl acetate at 70° C. 500 ml of deionized water was added to the solution while the solution was stirred using a magnetic stirrer to produce an oil-in-water dispersion of coarse particles. The coarse particles were made fine by passing the dispersion of coarse particles through MICROFLUIDIZER (manufactured by Microfluidex, Inc.) five times at a pressure of 600 bar. In order to remove the solvents, the resulting emulsion was placed in a rotary evaporator until no fumes of ethyl acetate were sensed. 140 g of diethylene glycol, 50 g of glycerine, 7 g of SURFYNOL 465 (produced by Air Products & Chemicals, Inc.), and 900 ml of deionized water were added to the resulting microemulsion of a hydrophobic dye to produce ink.

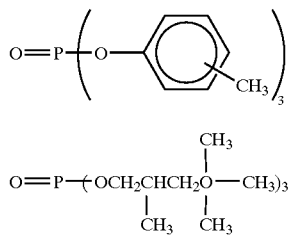

Production of Samples 102 to 104

Samples 102 to 104 were produced in the same way as in the production of the sample 101, except that the dye 2 of the sample 101 was replaced with dyes shown in Table 1 below.

Image Recording and Evaluations

The following evaluations were carried out for the ink samples 101 to 104 and a comparative sample. The results thereof are given in Table 1 below.

"Color Tone", "Paper Dependence", "Water Resistance", and "Light Resistance" in Table 1 were evaluated after an image had been recorded onto a photo glossy paper (ink jet printing paper of photographic grade, manufactured by Fuji Photo Film Co., Ltd.) by an ink jet printer (PM-700C manufactured by Seiko Epson Corp.) using each ink for ink jet recording.

Color Tone

Color tone was visually observed and evaluated in three stages of A (excellent), B (good), and C (poor).

Paper Dependence

The color tone of the image formed on the photographic glossy paper was compared with the color tone of an image formed on a plain paper for PPC. The evaluations were made in two stages of A (good; a case in which the difference in color tone between the two images is small) and B (poor; a case in which the difference between the two images is large).

Water Resistance

The photo glossy paper having the above image formed thereon was dried at room temperature for one hour. Subsequently, the paper was immersed in water for 30 seconds and air-dried at room temperature. Thereafter, blur of the image was observed. The image was evaluated in three stages of A (no blur), B (slight formation of blur), and C (a large number of blurs).

Light Resistance

A xenon light (85000 1x) was irradiated onto the photo glossy paper, on which the above image had been formed, for 3 days using a weather meter (ATLAS C. 165). The image density before the xenon light was irradiated and the image density after the xenon light was irradiated were measured using a reflection densitometer (X-Rite 310 TR) and evaluated as a dye remaining rate. The above reflection densities were measured at three points of 1, 1.5, and 2.0.

The evaluations were made at three stages of A (a case in which the dye remaining rates at all of the densities are 70% or more), B (a case in which the dye remaining rate(s) at one or two points is/are less than 70%), and C (a case in which the dye remaining rates at all of the densities are less than 70%).

Resistance to Ozone

The photo glossy paper, on which the above image had been formed, was allowed to stand in a box at an ozone concentration of 0.5 ppm for 24 hours. The image densities before and after the image was allowed to stand in the presence of ozone were measured using the reflectance densitometer (X-Rite 31OTR) and evaluated as a dye remaining rate. The dye remaining rate was evaluated at three points of 1, 1.5, and 2.0 of the reflection densities. The concentration of ozone in the box was set by using an ozone monitor manufactured by APPLICS (model: OZG-EM-01).

The evaluations were made in three stages of A (a case in which the dye remaining rate at any of the densities is 70% or more), B (a case in which the dye remaining rate(s) at one or two points is/are less than 70%), and C (a case in which the dye remaining rates at all of the densities are less than 70%).

TABLE 1

| Sample | Dye No. | Hue | Paper Dependence | Water resistance | Light resistance | Resistance to ozone | |
|---|---|---|---|---|---|---|---|
| 101 | 2 | A | A | A | A | A | Present invention |
| 102 | 3 | A | A | A | A | A | Present invention |

TABLE 1-continued

| Sample | Dye No. | Hue | Paper Dependence | Water resistance | Light resistance | Resistance to ozone | |
|---|---|---|---|---|---|---|---|
| 103 | 8 | A | A | A | A | A | Present invention |
| 104 | 12 | A | A | A | A | A | Present invention |
| Ink A | Comparative dye A | B | B | B | C | C | Comparative Example |
| Ink B | Comparative dye B | A | B | C | C | C | Comparative Example |

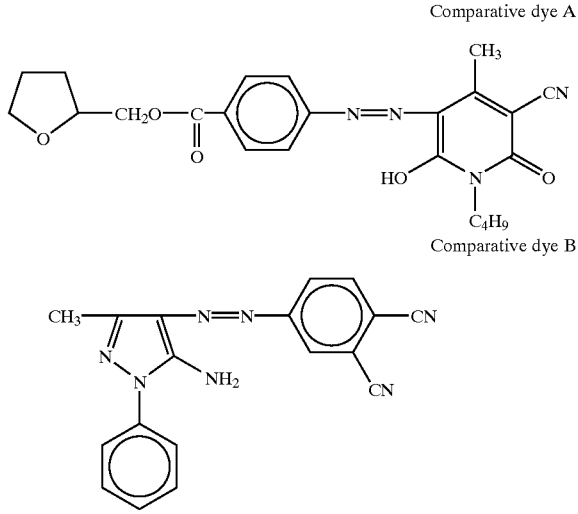

Comparative dye A

Comparative dye B

As can be clearly seen from Table 1, the inks for ink jet recording comprised of the ink compositions for ink jet recording have excellent solubility and excellent color tone, small paper dependence, and excellent resistance to water, light, and ozone.

Example 2

Ink identical to the ink produced in Example 1 was charged into a cartridge for an ink jet printer BJ-F850 (manufactured by Canon Inc.) to print an image on a photo glossy paper GP-301 (produced by Canon Inc.) Evaluations similar to the evaluations in Example 1 were made, and the results similar to those of Example 1 were obtained.

Example 3

3 parts by mass of the dye 2 of the present invention and 100 parts by mass of toner resin (i.e., a copolymer of styrene and acrylic ester under the commercial name of HIMER TB-1000F produced by Sanyo Chemical Industries, Ltd.) were mixed together and pulverized using a ball mill. Thereafter, the mixture was melted and blended by heating to 150° C. After the resulting product was cooled, the product was pulverized into coarse particles using a hammer mill and then into fine particles using an air jet-type pulverizing mill. The fine particles thus obtained were further classified, and particles having a particle diameter of 1 to 20 μm were selected as toner. 900 parts by mass of an iron powder carrier (EFV250/400 produced by Powdertech Co., Ltd.) was uniformly mixed with 10 parts by mass of the toner to obtain a developer. Samples were prepared in the same way except that 3 parts by mass of respective dyes shown in Table 2 were used. Copying was carried out by a dry-process electrophotographic copying machine for plain paper (NP-5000 manufactured by Canon Inc.) using the respective developers.

A reflection image (i.e., an image on paper) and a transparency image (i.e., an image for the OHP) were formed on paper and a sheet for the OHP, respectively, in accordance with the above-described image forming method, using the developers containing the composition for color toner of the present invention. Evaluation tests were carried out as follows. The amount of toners adhering to the paper was evaluated within a range of $0.7 \pm 0.05$ mg/cm$^2$.

Hue and lightfastness of the obtained images were evaluated. Hue was evaluated in three stages of excellent, good, and poor by visual observation. The evaluation results are given in Table 2 below. In Table 2, o indicates excellent hue, Δ indicates good hue, and X indicates poor hue. Lightfastness was evaluated in the following manner. The image density Ci was measured for each of the images immediately after the image was recorded. Thereafter, a xenon light (85000 1x) was irradiated onto the image for 5 days using the weather meter (ATLAS C. 165). The image density Cf was measured, and the difference between the image densities before and after the xenon light was irradiated was calculated as a dye remaining rate ($\{(Ci-Cf)/Ci\} \times 100\%$), and lightfastness was evaluated based on the dye remaining rate. The image densities were measured by the reflection densitometer (X-Rite 31 OTR). The evaluation results are given in Table 2 below. In Table 2, o indicates a case in which the dye remaining rate is 90% or more, Δ indicates a case in which the dye remaining rate is 80 to 90%, and X indicates a case in which the dye remaining rate is less than 80%.

Transparency of the images for the OHPs was evaluated as follows. The visible spectrophotometric transmittance of each image was measured using a 330-type self-recording spectrophotometer manufactured by Hitachi, Ltd, and the spectrophotometric transmittance at 650 nm was determined and used for the evaluation. The spectrophotometric transmittance of a sheet for the OHP having no toner held thereon was used as a reference. The results are given in Table 2 below. In Table 2, o indicates that the spectrophotometric transmittance is 80% or more, Δ indicates that the spectrophotometric transmittance is 70 to 80%, and X indicates that the spectrophotometric transmittance is less than 70%.

TABLE 2

| | Compound No. | Hue | Lightfastness | Transparency |
|---|---|---|---|---|
| Present invention | 2 | ○ | ○ | ○ |
| Present invention | 3 | ○ | ○ | ○ |
| Present invention | 8 | ○ | ○ | ○ |

TABLE 2-continued

| | Compound No. | Hue | Lightfastness | Transparency |
|---|---|---|---|---|
| Present invention | 12 | ○ | ○ | ○ |
| Comparative Example | C.I. Solvent Yellow 162 | Δ | Δ | Δ |

As can be clearly seen from Table 2, the composition for color toner of the present invention provides accurate color reproduction and high image quality for the OHPs, and is thus suited for use as full-color toner. Further, since the composition for color toner of the present invention has good resistance to light, it can form images which can be stored over a long period of time.

Example 4

A color filter including the composition for a color filter of the present invention was manufactured as follows. A silicon wafer was spin coated with a positive photoresist composition containing a thermosetting resin, a quinondiazide compound, a crosslinking agent, a dye, and a solvent, and the solvent was vaporized by heating. Subsequently, the silicon wafer was exposed using a mask to decompose the quinonediazide compound. The silicon wafer was optionally heated, and developed to obtain a mosaic pattern. The exposure was carried out by an i ray exposure stepper HITACHI LD-5010-i (NA=0.40) manufactured by Hitachi, Ltd. SOPD or SOPD-B produced by Sumitomo Chemical Co., Ltd. was used as a developer.

Preparation of the Composition for a Color Filter (Positive Photoresist Composition) of the Present Invention 3.4 parts by mass of cresol novolak resin (weight average molecular weight of 4300 in terms of polystyrene) obtained from a mixture of m-cresol, p-cresol, and formaldehyde (reaction molar ratio =5/5/7.5), 1.8 parts by mass of o-naphthoquinonediazide-5-sulfonate (with two hydroxyl groups on the average being esterified) produced by using a phenol compound represented by the following formula, 0.8 parts by mass of hexamethoxymethylol melamine, 20 parts by mass of ethyl lactate, and 1 part by mass of each of dyes shown in Table 3 below were mixed to obtain a composition for a color filter (positive photoresist composition) of the present invention.

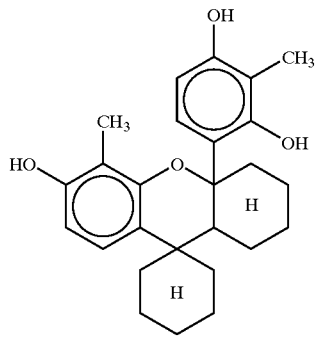

Manufacturing of a Color Filter

A silicon wafer was spin coated with the positive photoresist composition thus obtained, and then the solvent was vaporized. The silicon wafer was exposed and heated to 100° C. Subsequently, exposed portions were removed by alkali development to obtain a positive coloring pattern having a resolution of 0.8 μm. After the entire pattern was exposed, the pattern was heated at 150° C. for 15 minutes to obtain a complementary color filter of magenta.

Comparative Example

Instead of the dyes of the present invention used in the above Examples, 1 part by mass of Oleosol Yellow 2G produced by Sumitomo Chemical Co., Ltd. was mixed to obtain a positive photoresist composition. A silicon wafer was spin coated with the positive photoresist composition thus obtained, and then the solvent was vaporized. The silicon wafer was subjected to exposure and alkali development to obtain a positive coloring pattern having a resolution of 1 μm. After the entire pattern was exposed, the pattern was heated at 150° C. for 15 minutes to obtain a yellow color filter for comparison.

Evaluations

The transmission spectrum of each of the yellow color filters obtained above was measured, and the state of the spectrum at long waves (sharp cut), which is important in terms of color reproduction, was relatively evaluated. o indicates that the state is good, Δ indicates that the state is still acceptable, and X indicates that the state is unacceptable. Further, a xenon light (85000 1x) was irradiated onto each of the yellow color filters for 7 days using the weather meter (ATLAS C. 165). The image density before the xenon light was irradiated and the image density after the xenon light was irradiated were measured, and the difference was evaluated as a dye remaining rate. The results are given in Table 3.

TABLE 3

| | Dye No. | Absorption property | Lightfastness |
|---|---|---|---|
| Present invention | 2 | ○ | 95% |
| Present invention | 3 | ○ | 97% |
| Comparative Example | Oleosol Yellow 2G | Δ | 60% |

It can be seen that, in comparison with the Comparative Example, the long waves of the spectrum are precipitous and color reproduction is excellent when the dyes of the present invention are used. It can be also seen that lightfastness is excellent as compared with that of the comparative compound.

What is claimed is:

1. An ink composition for ink jet recording containing at least one dye represented by the following General Formula (1):

$$A-N=N-B \quad \text{General Formula (1)}$$

wherein A and B independently represent a heterocyclic group; at least one of A and B has one or more substituents: at least one of the one or more substituents includes an alkyl chain having at least 4 carbon atoms; the one or more substituents has 17 or more carbon atoms in total: and no ionic hydrophilic group is included.

2. The ink composition for ink jet recording of claim 1, wherein the dye represented by General Formula (1) is a dye represented by the following General Formula (2):

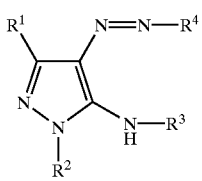

General Formula (2)

wherein $R^1$ and $R^3$ each represent a hydrogen atom, an alkyl group, a cycloalkyl group, an aralkyl group, an alkoxy group or an aryl group, $R^2$ represents a hydrogen atom, an alkyl group, a cycloalkyl group, an aralkyl group, a carbamoyl group, an acyl group, an aryl group or a heterocyclic group; $R^4$ represents a heterocyclic group; at least one of $R^1$, $R^2$, $R^3$ and $R^4$ includes an alkyl chain having at least 4 carbons; and no ionic hydrophilic group is included.

3. The ink composition for ink jet recording of claim 2, wherein the dye represented by General Formula (2) is represented by the following General Formula (3):

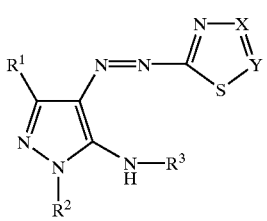

General Formula (3)

wherein $R^1$ and $R^3$ each represent a hydrogen atom, an alkyl group, a cycloalkyl group, an aralkyl group, an alkoxy group or an aryl group; $R^2$ represents a hydrogen atom, an alkyl group, a cycloalkyl group, an aralkyl group, a carbamoyl group, an acyl group, an aryl group or a heterocyclic group; and one of X and Y is $CR^5$ and the other is a nitrogen atom; $R^5$ is a hydrogen atom, a halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group; and respective substituents thereof may be further substituted as long as at least one of $R^1$, $R^2$, $R^3$, X, and Y includes an alkyl chain having at least 4 carbon atoms and no ionic hydrophilic group is included.

4. The ink composition for ink jet recording of claim 1, further containing an aqueous medium.

5. The ink composition for ink jet recording of claim 4, wherein the amount of the dye represented by General Formula (1) in 100 parts by mass of the ink composition for ink jet recording is 0.2 to 10 parts by mass.

6. An ink jet recording method, in which an image is formed on an image receiving material comprising a support having disposed thereon an ink receiving layer containing white inorganic pigment particles, using an ink for ink jet recording comprised of the ink composition for ink jet recording of claim 1.

7. The ink jet recording method of claim 6, wherein the dye represented by General Formula (1) is represented by the following General Formula (2):

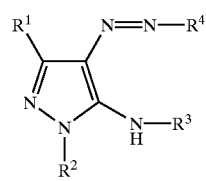

General Formula (2)

wherein $R^1$ and $R^3$ each represent a hydrogen atom, an alkyl group, a cycloalkyl group, an aralkyl group, an alkoxy group or an aryl group, $R^2$ represents a hydrogen atom, an alkyl group, a cycloalkyl group, an aralkyl group, a carbamoyl group, an acyl group, an aryl group or a heterocyclic group; $R^4$ represents a heterocyclic group; at least one of $R^1$, $R^2$, $R^3$ and $R^4$ includes an alkyl chain having at least 4 carbons; and no ionic hydrophilic group is included.

8. The ink jet recording method of claim 7, wherein the dye represented by General Formula (2) is represented by the following General Formula (3):

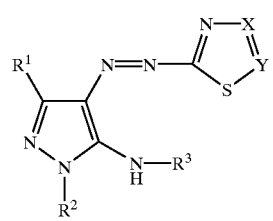

General Formula (3)

wherein $R^1$ and $R^3$ each represent a hydrogen atom, an alkyl group, a cycloalkyl group, an aralkyl group, an alkoxy group or an aryl group; $R^2$ represents a hydrogen atom, an alkyl group, a cycloalkyl group, an aralkyl group, a carbamoyl group, an acyl group, an aryl group or a heterocyclic group; one of X and Y is $CR^5$ and the other is a nitrogen atom; $R^5$ is a hydrogen atom, a halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group; and respective substituents thereof may be further substituted as long as at least one of $R^1$, $R^2$, $R^3$, X, and Y includes an alkyl chain having at least 4 carbon atoms and no ionic hydrophilic group is included.

9. A composition for color toner, containing a dye represented by the following General Formula (1):

$$A-N=N-B \quad \text{General Formula (1)}$$

wherein A and B independently represent a heterocyclic group; at least one of A and B has one or more substituents; at least one of the one or more substituents includes an alkyl chain having at least 4 carbon atoms; the one or more substituents has 17 or more carbon atoms in total; and no ionic hydrophilic group is included.

10. The composition for color toner of claim 9, wherein the dye represented by General Formula (1) is represented by the following General Formula (2):

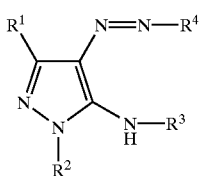

General Formula (2)

where $R^1$ and $R^3$ each represent a hydrogen atom, an alkyl group, a cycloalkyl group, an aralkyl group, an alkoxy group or an aryl group, $R^2$ represents a hydrogen atom, an alkyl group, a cycloalkyl group, an aralkyl group, a carbamoyl group, an acyl group, an aryl group or a heterocyclic group; $R^4$ represents a heterocyclic group; at least one of $R^1$, $R^2$, $R^3$ and $R^4$ includes an alkyl chain having at least 4 carbons; and no ionic hydrophilic group is included.

11. The composition for color toner of claim 10, wherein the dye represented by General Formula (2) is represented by the following General Formula (3):

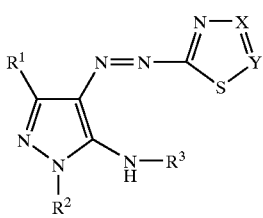

General Formula (3)

wherein $R^1$ and $R^3$ each represent a hydrogen atom, an alkyl group, a cycloalkyl group, an aralkyl group, an alkoxy group or an aryl group; $R^2$ represents a hydrogen atom, an alkyl group, a cycloalkyl group, an aralkyl group, a carbamoyl group, an acyl group, an aryl group or a heterocyclic group; one of X and Y is $CR^5$ and the other is a nitrogen atom; $R^5$ is a hydrogen atom, a halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group; and respective substituents thereof may be further substituted as long as at least one of $R^1$, $R^2$, $R^3$, X, and Y includes an alkyl chain having at least 4 carbon atoms and no ionic hydrophilic group is included.

12. A composition for a color filter, containing a dye represented by the following General Formula (1):

  General Formula (1)

wherein A and B independently represent a heterocyclic group; at least one of A and B has one or more substituents; at least one of the one or more substituents includes an alkyl chain having at least 4 carbon atoms; the one or more substituents has 17 or more carbon atoms in total; and no ionic hydrophilic group is included.

13. The composition for a color filter of claim 12, wherein the dye represented by General Formula (1) is represented by the following General Formula (2):

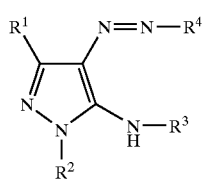

General Formula (2)

wherein $R^1$ and $R^3$ each represent a hydrogen atom, an alkyl group, a cycloalkyl group, an aralkyl group, an alkoxy group or an aryl group, $R^2$ represents a hydrogen atom, an alkyl group, a cycloalkyl group, an aralkyl group, a carbamoyl group, an acyl group, an aryl group or a heterocyclic group; $R^4$ represents a heterocyclic group; at least one of $R^1$, $R^2$, $R^3$ and $R^4$ includes an alkyl chain having at least 4 carbons; and no ionic hydrophilic group is included.

14. The composition for a color filter of claim 13, wherein the dye represented by General Formula (2) is represented by the following General Formula (3):

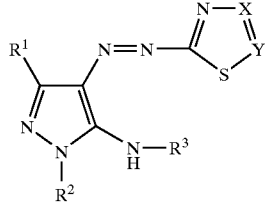

General Formula (3)

wherein $R^1$ and $R^3$ each represent a hydrogen atom, an alkyl group, a cycloalkyl group, an aralkyl group, an alkoxy group or an aryl group; $R^2$ represents a hydrogen atom, an alkyl group, a cycloalkyl group, an aralkyl group, a carbamoyl group, an acyl group, an aryl group or a heterocyclic group; one of X and Y is $CR^5$ and the other is a nitrogen atom; $R^5$ is a hydrogen atom, a halogen atom, a cyano group, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group, or an acylamino group; and respective substituents thereof may be further substituted as long as at least one of $R^1$, $R^2$, $R^3$, X, and Y includes an alkyl chain having at least 4 carbon atoms and no ionic hydrophilic group is included.

15. The ink composition for ink jet recording of claim 2, wherein in the dye represented by General Formula (2), $R^2$ represents a substituted aryl group.

16. An ink composition for ink jet recording containing at least one dye represented by the following General Formula (1):

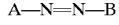  General Formula (1)

wherein A and B independently represent a heterocyclic group; at least one of A and B has one or more substituents; at least one of the one or more substituents includes an alkyl chain having at least 4 carbon atoms; and no ionic hydrophilic group is included; and
wherein the dye represented by General Formula (1) is a dye represented by the following General Formula (2):

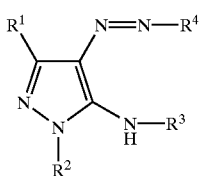

General Formula (2)

wherein $R^1$ and $R^3$ each represent a hydrogen atom, an alkyl group, a cycloalkyl group, an aralkyl group, an alkoxy group or an aryl group; $R^2$ represents a substituted aryl group; $R^4$ represents a heterocyclic group; at least one of $R^1$, $R^2$, $R^3$ and $R^4$ includes an alkyl chain having at least 4 carbons; and no ionic hydrophilic group is included.

17. A composition for color toner, containing a dye represented by the following General Formula (1):

   General Formula (1)

wherein A and B independently represent a heterocyclic group; at least one of A and B has one or more substituents; at least one of the one or more substituents includes an alkyl chain having at least 4 carbon atoms; and no ionic hydrophilic group is included; and
the dye represented by General Formula (1) is represented by the following General Formula (2):

General Formula (2)

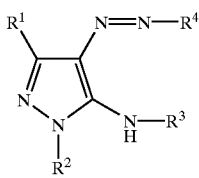

where $R^1$ and $R^2$ each represent a hydrogen atom, an alkyl group, a cycloalkyl group, an aralkyl group, an alkoxy group or an aryl group; $R^2$ represents a substituted aryl group; $R^4$ represents a heterocyclic group; at least one of $R^1$, $R^2$, $R^3$ and $R^4$ includes an alkyl chain having at least 4 carbons; and no ionic hydrophilic group is included.

18. A composition for a color filter, containing a dye represented by the following General Formula (1):

   General Formula (1)

wherein A and B independently represent a heterocyclic group; at least one of A and B has one or more substituents; at least one of the one or more substituents includes an alkyl chain having at least 4 carbon atoms; and no ionic hydrophilic group is included; and
wherein the dye represented by General Formula (1) is represented by the following General Formula (2):

General Formula (2)

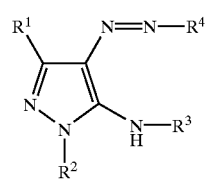

wherein $R^1$ and $R^3$ each represent a hydrogen atom, an alkyl group, a cycloalkyl group, an aralkyl group, an alkoxy group or an aryl group; $R^2$ represents a substituted aryl group; $R^4$ represents a heterocyclic group; at least one of $R^1$, $R^2$, $R^3$ and $R^4$ includes an alkyl chain having at least 4 carbons; and no ionic hydrophilic group is included.

* * * * *